US007488119B2

(12) United States Patent
Yoshida et al.

(10) Patent No.: US 7,488,119 B2
(45) Date of Patent: Feb. 10, 2009

(54) PHOTOELECTRIC COMPOSITE CONNECTOR AND SUBSTRATE USING THE SAME

(75) Inventors: Takumi Yoshida, Shinagawa-ku (JP); Shuji Suzuki, Shinagawa-ku (JP); Hiroaki Okano, Shinagawa-ku (JP); Seiki Hiramatsu, Chiyoda-ku (JP)

(73) Assignees: Hirose Electric Co., Ltd., Tokyo (JP); Mitsubishi Deni Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/656,128

(22) Filed: Jan. 22, 2007

(65) Prior Publication Data

US 2007/0122088 A1 May 31, 2007

Related U.S. Application Data

(63) Continuation of application No. PCT/JP2005/013273, filed on Jul. 20, 2005.

(30) Foreign Application Priority Data

Jul. 21, 2004 (JP) .............................. 2004-213082

(51) Int. Cl.
*G02B 6/36* (2006.01)
*G02B 6/42* (2006.01)

(52) U.S. Cl. ............................. 385/89; 385/14; 385/31; 385/52; 385/92; 385/139

(58) Field of Classification Search ................... 385/14, 385/31, 52, 88–89, 92, 139
See application file for complete search history.

(56) References Cited

U.S. PATENT DOCUMENTS 5,163,109 A * 11/1992 Okugawa et al. .............. 385/94

(Continued)

FOREIGN PATENT DOCUMENTS

JP 4-230978 A 8/1992

(Continued)

OTHER PUBLICATIONS

W. Sakurai et al., "A Novel Optoelectronic Ferrule for Cost-effective Optical Interconnection Modules", Proceedings of ECOC 2006, Paper We3., p. 53, pp. 227-228, 2006.

(Continued)

*Primary Examiner*—Frank G Font
*Assistant Examiner*—Michael P Mooney
(74) *Attorney, Agent, or Firm*—Cohen Pontani Lieberman & Pavane LLP

(57) ABSTRACT

A photoelectric composite connector comprises a first connector unit which is connected to optical transmission means and a second connector unit which can be attached to and detached from a first connector unit freely. The first connector unit comprises a photoelectric conversion module and an electrical connector section having a first conductor which is electrically connected to the photoelectric conversion module. The second connector unit is formed as an electrical connector unit corresponding to the electrical connector section of the first connector unit and having a second conductor. The first conductor of the electrical connector section of the first connector unit and the second conductor of the second connector unit are electrically connected to each other when the electrical connector section of the first connector unit and the second connector unit are connected to each other by use of their electrical connector structures.

6 Claims, 8 Drawing Sheets

U.S. PATENT DOCUMENTS 6,934,450 B2 * 8/2005 Hiramatsu .................... 385/52
6,994,480 B2 * 2/2006 Inujima et al. ................ 385/92

FOREIGN PATENT DOCUMENTS

| JP | 5-343141 A | 12/1993 |
| JP | 2004-191555 A | 7/2004 |
| JP | 2004-191564 A | 7/2004 |
| WO | WO 9004801 | 5/1990 |
| WO | WO 02/25341 A1 | 3/2002 |

OTHER PUBLICATIONS

Kosaka et al., "Multidimensional VCSEL-Array Push/Pull Module Fabricated Using the Self-Alignment Mounting Technique," IEEE Transactions on Components, Packaging, and Manufacturing Technology, Part B., vol. 21, No. 4, pp. 471-478, Nov. 1998.

Supplementary European Search Report dated Aug. 17, 2007 issued for the corresponding European Patent Application No. EP 05 76 6319.

* cited by examiner

PHOTOELECTRIC COMPOSITE CONNECTOR AND SUBSTRATE USING THE SAME

RELATED APPLICATION

This application is a U.S. Continuation Application of International Application PCT/JP2005/013273 filed Jul. 20, 2005.

BACKGROUND OF THE INVENTION (i) Field of the Invention

The present invention relates to a photoelectric converter that is capable of conversion between light and electricity. Further, the present invention relates to a photoelectric composite connector and a substrate that can be used in such a photoelectric converter, i.e. a photoelectric composite connector using an electrical connector structure and a substrate using the photoelectric composite connector.

(ii) Description of the Related Art

A photoelectric converter has been widely used in such a manner that it is connected to optical transmission means such as an optical fiber so as to, for example, transmit a high-frequency electrical signal. As is well known, the high-frequency electrical signal may have noise when the traveling distance is long. Thus, it is often practiced that an optical signal is used in place of the electrical signal and a photoelectric converter is used at the end of transmission so as to convert the optical signal into the electrical signal or the electrical signal into the optical signal and use the electrical (or optical) signal.

In recent years, an attempt to use such an optical signal in short-distance connection, e.g. on a substrate (between devices on the same substrate) or between substrates, by use of a small-sized photoelectric converter in particular has started. Illustrative examples of currently usable devices include a type having an optical waveguide embedded in a substrate and a type having a film waveguide laminated on a substrate. In the case of these types, an optical signal is transmitted through a waveguide provided inside or outside a substrate, and the optical signal is converted into an electrical signal by a photoelectric conversion device which is provided separately from the above waveguide. In addition to these types, another type has an optical member at the tip of an optical fiber as a plug-side connector and uses a photoelectric conversion device as the corresponding receptacle-side connector to perform conversion between light and electricity. However, these devices require a highly accurate optical alignment between the optical member or waveguide and the photoelectric conversion device and also require a highly accurate alignment between the optical member and the substrate when the optical member is soldered to the substrate. In particular, since the substrate hardly enjoys surface dimensional accuracy due to warpage or distortion, it is difficult to control such an alignment. Further, although these devices require a measure for dealing with degradation of the performance of light-emitting and light-receiving elements mounted in the devices, e.g. a measure for static electricity, it is difficult to take a measurement for the performance degradation since the light-emitting and light-receiving elements must be mounted on the substrate having a number of other electrical elements mounted thereon.

With respect to an optical alignment, a technique for facilitating an optical alignment between an optical fiber and a waveguide is disclosed in Japanese Patent Laid-Open Publication No. 264587/2001 and other literatures. The literature discloses a structure having an optical connector section, more specifically, a structure which enables an optical fiber to be connected to an optical connector section integrated with a waveguide having a photoelectric conversion device by means of an atonality core. However, the connector section used in this structure is a so-called optical connector section which is merely used for optical connection and is not used for electrical connection.

Further, with respect to a photoelectric converter, a photoelectric converter having an integrated module, i.e. a module comprising integration of waveguide (light path right-angle conversion waveguide) and a photoelectric conversion device, at the tip of an optical fiber has been presented in the fourth Electronic System Integration Study Debriefing Session taken place in the National Museum of Emerging Science and Innovation at Jun. 13, 2003 under the auspices of Technology Research Association—Association of Super-Advanced Electronics Technologies (ASET) and others. The integrated module presented in the session is considered to be an effective constitution which facilitates an optical alignment between a waveguide and a photoelectric conversion module. However, a problem of alignment between a device and a substrate still remains even in such a constitution.

Patent Literature 1: Japanese Patent Laid-Open Publication No. 264587/2001

Non-Patent Literature 1: Fourth Electronic System Integration Study Debriefing Session, (time) Jun. 13, 2003, (place) National Museum of Emerging Science, (host) Technology Research Association—Association of Super-Advanced Electronics Technologies (ASET), (co-host) National Institute of Advanced Industrial Science and Technology (AIST), (sponsorship) New Energy and Industrial Technology Development Organization (NEDO)

The present invention has been conceived to solve these problems of the prior art. An object of the present invention is to provide a photoelectric composite connector that allows an accurate and easy optical alignment between a photoelectric conversion device and a waveguide and does not require as high accuracy in alignment between an optical member and a substrate as an optical connector does, and a substrate using the photoelectric composite connector. Another object of the present invention is to makes it possible to connect or disconnect a substrate by a connector and improve usability.

SUMMARY OF THE INVENTION

In a photoelectric composite connector according to the present invention, an optical signal transmitted to a plug-side connector through optical transmission means is transmitted to a receptacle-side connector as an electrical signal, only after the optical signal is converted into the electrical signal by the plug-side connector. Meanwhile, an electrical signal transmitted to the plug-side connector through the receptacle-side connector is transmitted as an optical signal through the optical transmission means connected to the plug-side connector, only after the electrical signal is converted into the optical signal by the plug-side connector. That is, not transmission of optical signal but only transmission of electrical signal is carried out between the plug-side connector and receptacle-side connector of the present invention. Therefore, according to the above constitution, a general electrical connector structure can be used between the plug-side connector and the receptacle-side connector.

The present invention provides a photoelectric composite connector using the above principle. The photoelectric composite connector comprises:

a first connector unit which is connected to optical transmission means, and a second connector unit which can be attached to and detached from the first connector unit freely, wherein the first connector unit comprises a photoelectric conversion module and an electrical connector section having a first conductor which is electrically connected to the photoelectric conversion module, the second connector unit is formed as an electrical connector unit corresponding to the electrical connector section of the first connector unit and having a second conductor, and the first conductor of the electrical connector section of the first connector unit and the second conductor of the second connector unit are electrically connected to each other when the electrical connector section of the first connector unit and the second connector unit are connected to each other by use of their electrical connector structures.

The above connector may be constituted such that the second connector unit comprises a photoelectric conversion module and an electrical connector section having the second conductor which is electrically connected to the photoelectric conversion module, and the first conductor of the electrical connector section of the first connector unit and the second conductor of the second connector unit are electrically connected to each other when the electrical connector section of the first connector unit and the electrical connector section of the second connector unit are connected to each other by use of their electrical connector structures.

Further, in the above connector, the photoelectric conversion module may comprise a photoelectric conversion device and a waveguide. Further, the waveguide may be a waveguide which changes the direction of a light path at a right angle.

Further, both the waveguide and the photoelectric conversion device may be of matrix type. Further, the photoelectric conversion device may be VCSEL, a photodiode or an organic thin film having a light emitting function.

In the above connector, the second connector unit may be surface-mounted on a substrate. Further, the substrate may have a unit which drives the photoelectric conversion device. Further, the above connector may further comprise, between the first connector unit and the optical transmission means, an auxiliary connector which can be attached to and detached from the first connector unit freely and is connected to the optical transmission means. Further, in the above connector, the first connector unit may be a plug-side connector and the second connector may be a receptacle-side connector.

Further, the present invention provides a substrate using a photoelectric composite connector, wherein the photoelectric composite connector comprises a first connector unit which is connected to optical transmission means, and a second connector unit which is mounted on the substrate and can be attached to and detached from the first connector unit freely, the first connector unit comprises a photoelectric conversion module and an electrical connector section having a first conductor which is electrically connected to the photoelectric conversion module, the second connector unit is formed as an electrical connector unit corresponding to the electrical connector section of the first connector unit and having a second conductor, and the first conductor of the electrical connector section of the first connector unit and the second conductor of the second connector unit are electrically connected to each other when the electrical connector section of the first connector unit and the second connector unit are connected to each other by use of their electrical connector structures.

Despite use of an optical signal, an electrical connector structure can be used for connection between substrates or connection on a substrate. In the present invention, a highly accurate alignment is not required between a photoelectric conversion device and a waveguide or between an optical member and a substrate. Further, the present invention can make connection with a substrate easily by the electrical connector structure.

DETAILED DESCRIPTION OF THE PREFERRED EMBODIMENTS

Figure 1:
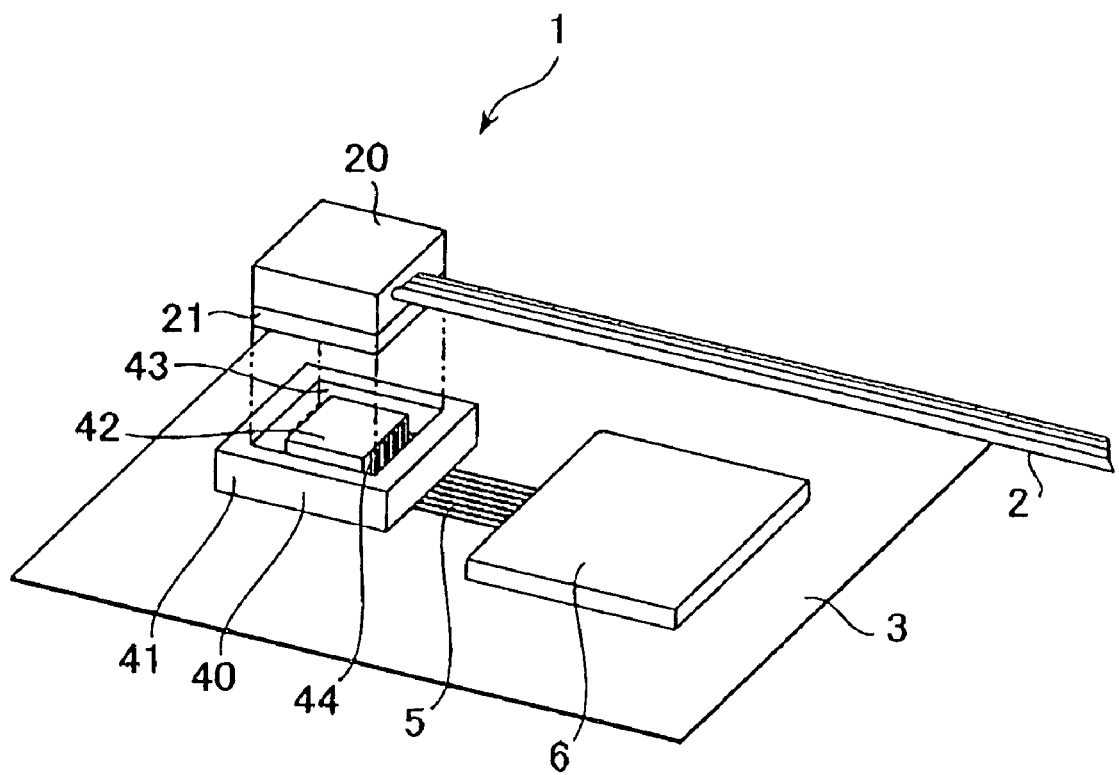
FIG. 1 is a diagram showing an example of connection using a photoelectric composite connector according to a first embodiment of the present invention.
Figure 2:
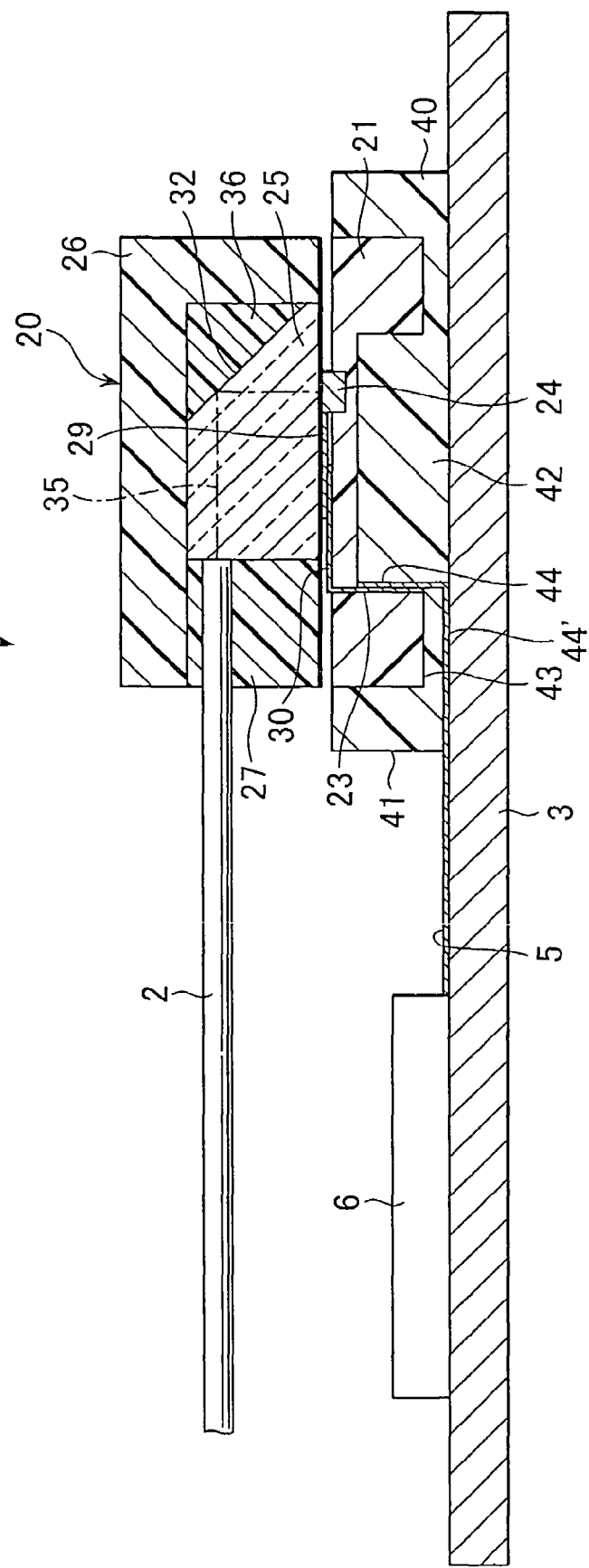
FIG. 2 is a cross-sectional view at the center line of FIG. 1.

FIG. 1 is a diagram showing an example of connection between substrates in particular, using a photoelectric composite connector according to a first embodiment of the present invention. FIG. 2 is a cross-sectional view at the center line of FIG. 1. It is needless to say that the photoelectric composite connector can be used for connection on a substrate and connection between devices as well as for connection between substrates.

The photoelectric composite connector 1 comprises a plug-side connector 20 and a receptacle-side connector 40. These connectors 20 and 40 can be attached to and detached from each other freely. FIG. 1 shows the connectors in a detached state, and FIG. 2 shows them in an attached state. Further, although not clear from the drawings, the connector 1 may be considered to have a size of about 5 mm in length, about 5 mm in width and about 2 mm in thickness as a whole, for example.

In this application example, for example, one end of optical transmission means such as an optical fiber 2 is connected to the plug-side connector 20, while the receptacle-side connector 40 is mounted on a surface of a substrate 3. When the receptacle-side connector 40 is surface-mounted on the substrate 3, it can be electrically connected to an IC driver for driving a device (photoelectric conversion device 24 to be described later) provided in the plug-side connector 20 via an electrical wire 5. While an IC driver of this type has heretofore been integrally formed as a part of a photoelectric converter, the present invention provides the IC driver on the substrate 3 separately from the connector to reduce the size of the connector. The optical fiber 2 which is connected to the plug-side connector 20 may be a generally used optical fiber such as multicore- and array-type fibers as shown in the drawings.

The receptacle-side connector 40 has an electrical connector structure to fit the plug-side connector 20 in the connector 40 at least on a side thereof on which the connector 20 fits the connector 40. The electrical connector structure is formed by the receptacle-side connector 40 itself. As is clear from using the electrical connector structure, only transmission of electrical signal is carried out between the plug-side connector 20 and the receptacle-side connector 40 in the present invention. Accordingly, it is satisfactory that the electrical connector structure and function of the receptacle-side connector 40 are at the same level as those of generally used electrical connectors.

As an example of the electrical connector structure described above, the receptacle-side connector 40 comprises, for example, a rectangular external wall 41, a rectangular island-shaped protruding section 42 which is situated inside the external wall 41, and a hollow section 43 which is formed between the external wall 41 and the protruding section 42. On external surfaces that the protruding section 42 faces, a plurality of conductors 44 which are partially exposed are provided in the direction in which the plug-side connector 20 fits in the connector 40 (although not clear from the drawings, eight conductors 44 are provided in total, at positions corresponding to conductors 23a to 23h to be described later of the plug-side connector 20). These, conductors 44 penetrate through the inside of the receptacle-side connector 40 and extend toward the outside of the receptacle-side connector 40 and can be electrically connected to an electrical terminal 5 on the substrate. The receptacle-side connector 40 can be secured there in the same manner as generally used electrical connectors are secured, by soldering these extending portions 44' to the substrate 3.

Figure 3:
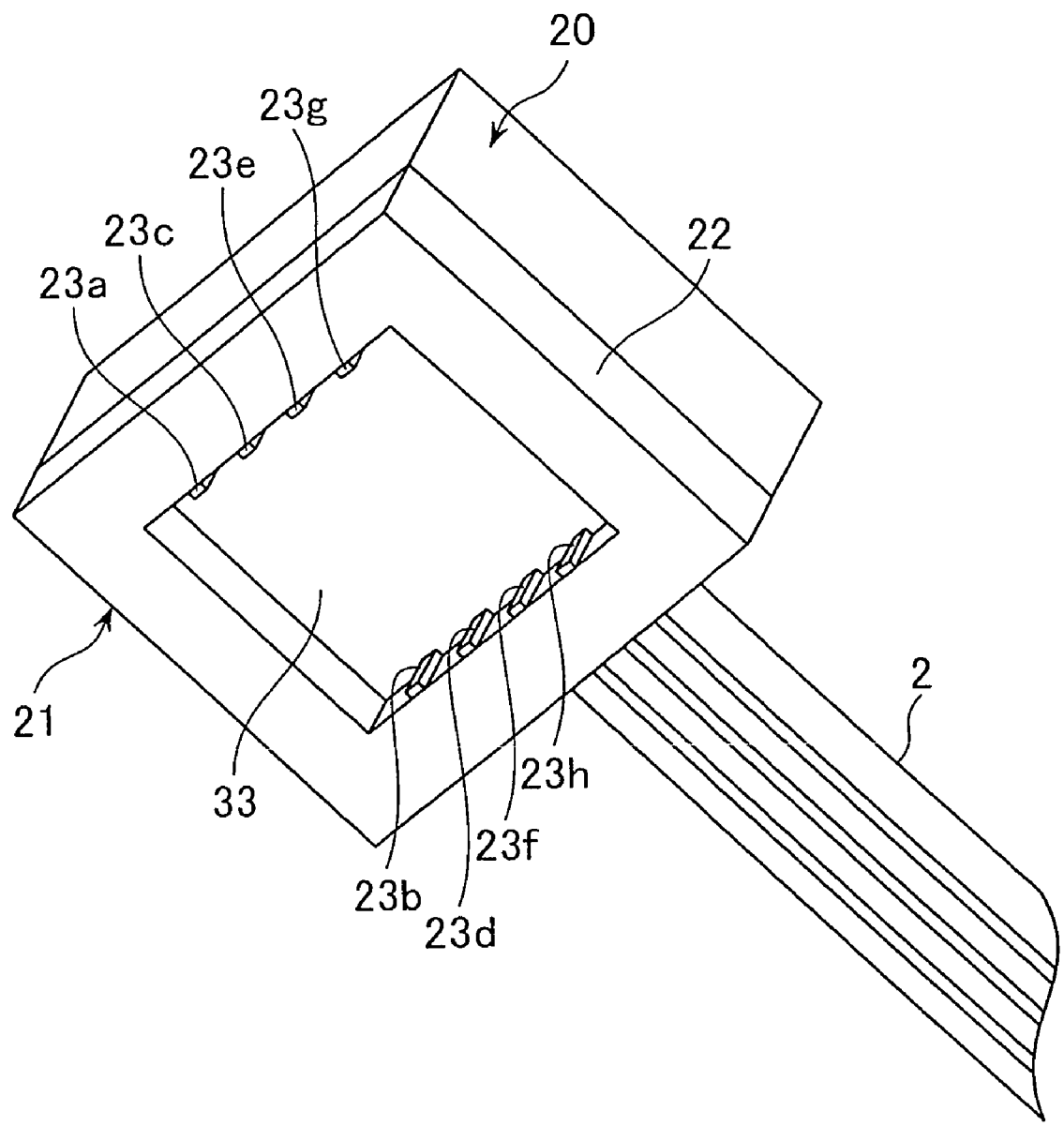
FIG. 3 is a diagram showing a plug-side connector shown in FIG. 1 when viewed from a side thereof which fits a receptacle-side connector.

FIG. 3 is a diagram showing the plug-side connector 20 and the optical fiber 2 connected thereto which are shown in FIG. 1 when viewed from a side thereof which fits the receptacle-side connector 40. FIG. 3 clearly shows the electrical connector structure of the plug-side connector 20 which corresponds to the electrical connector structure of the receptacle-side connector 40. Unlike the electrical connector structure of the receptacle-side connector 40, the electrical connector structure of the plug-side connector 20 is not formed by the plug-side connector 20 itself but formed by an electrical connector section 21 which is provided as a part of it. As described above, since only transmission of electrical signal is carried out between the plug-side connector 20 and the receptacle-side connector 40, it is satisfactory that the structure and function of the electrical connector section 21 of the plug-side connector 20 are at the same level as those of generally used electrical connectors.

The plug-side connector 20 has, for example, a protruding section 22 which has a rectangular hollow 33 in its central portion, to fit in the receptacle-side connector 40. On opposed internal surfaces of the protruding section 22, pairs of conductors 23a to 23h which correspond to the conductors 44 provided in the receptacle-side connector 40 along the direction in which the plug-side connector 20 fits in the receptacle-side connector 40. When the protruding section 22 of the plug-side connector 20 fits in the hollow 43 of the receptacle-side connector 40, these conductors 44 and 23 can be electrically and physically connected to each other one-on-one. As a result, an electrical signal is transmitted between the plug-side connector 20 and the receptacle-side connector 40.

Figure 4:
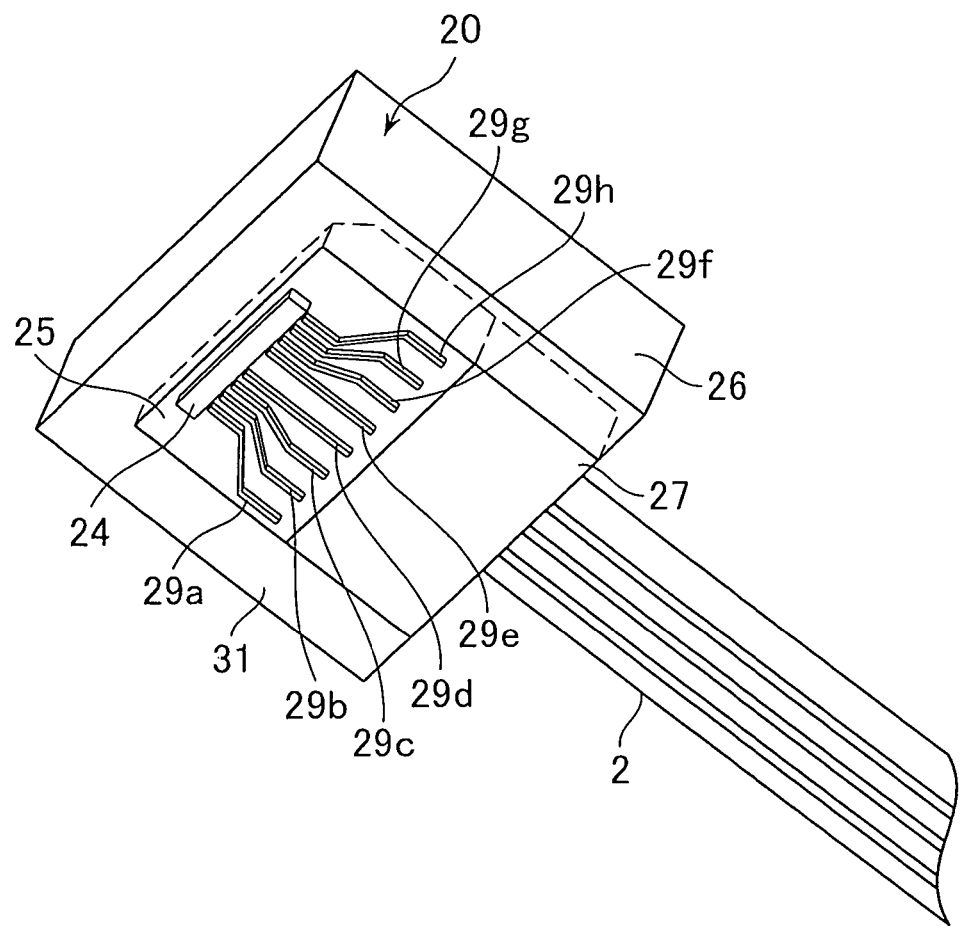
FIG. 4 is a diagram showing the plug-side connector shown in FIG. 3 without an electrical connector section.
Figure 5:
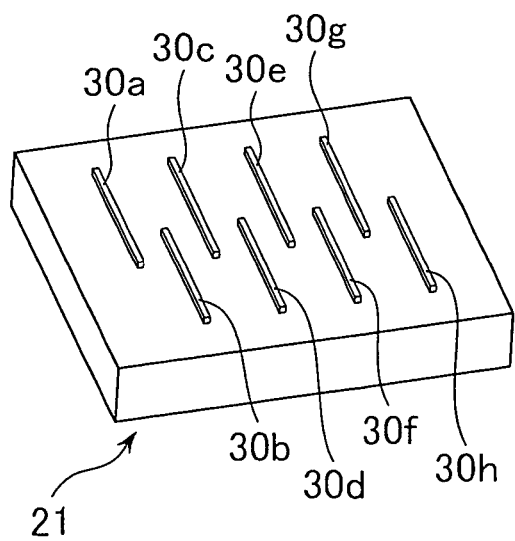
FIG. 5 is a schematic perspective view of the electrical connector section when viewed from a side thereof which contacts the plug-side connector.
Figure 6:
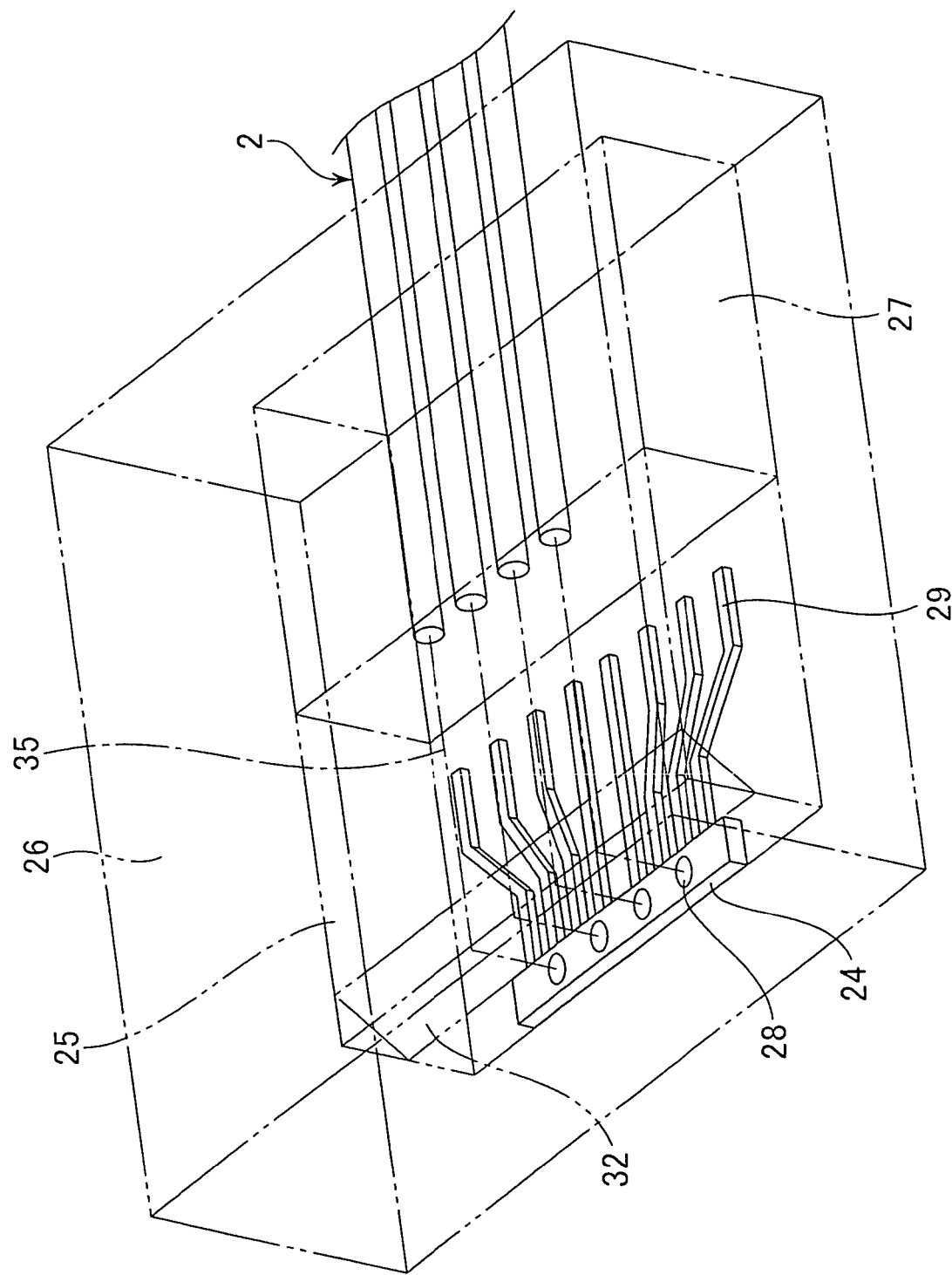
FIG. 6 is a schematic perspective view of the internal structure of the plug-side connector in the state shown in FIG. 4.

Next, the structure of the plug-side connector will be further described with reference to FIGS. 4 to 6 as well. FIG. 4 is a diagram showing the plug-side connector 20 without the electrical connector section 21. FIG. 5 is a schematic perspective view of the electrical connector section 21 when viewed from a side thereof which contacts the plug-side connector. FIG. 6 is a schematic perspective view of the internal structure of the plug-side connector 20 in the state shown in FIG. 4.

The plug-side connector 20 comprises a photoelectric conversion device 24, a waveguide 25, a housing 26 which surrounds these components 24 and 25, and the foregoing electrical connector section 21. The housing 26 is formed by an insulating material such as a synthetic resin and covers the whole waveguide 25 except for a side face 31 on which the plug-side connector 20 fits the receptacle-side connector 40.

As the photoelectric conversion device 24 and the waveguide 25, an integrated module of a photoelectric conversion device and a light path right-angle conversion waveguide described in Non-Patent Literature 1 is used, in particular. The light path right-angle conversion waveguide 25 which is provided adjacent to a pad 36 (refer to FIG. 2) has a mirror structure 32 which is disposed at an angle of about 45° to a light traveling direction and aligns tips by a fiber alignment plate 27, changes the direction of the light path of light 35 from each of the secured optical fibers 2 at a right angle and directs it to each spot 28 of the photoelectric conversion device 24 disposed in the light traveling direction. As the photoelectric conversion device 24, a light-receiving and light-emitting element such as VCSEL which is capable of emitting or receiving light from a number of spots at a time, a photodiode (PD) and an organic thin film having a light emitting function can be used. By using not a mere waveguide but the light path right-angle conversion waveguide 25, the height (thickness) of the connector can be kept small, whereby a low-height mount, small-sized connector can be provided. Further, when a matrix-type light path right-angle conversion waveguide having a plurality of waveguides 25 aligned in parallel is particularly used as the light path right-angle conversion waveguide 25, an alignment between multichannel cores and multichannel light-receiving and light-emitting elements is facilitated, and the size of the connector can be further reduced by reducing propagation loss. Further, when matrix-type VCSEL is used as the photoelectric conversion device 24, for example, an optical signal can be multichannel-transmitted, and a high-speed, large-capacity optical transmission system can be processed with parallel signals.

The spots 28 of the photoelectric conversion device 24 are electrically connected to a plurality of electric wiring patterns 29 provided at the bottom of the integrated module. When the integrated module is constituted, these electric wiring patterns 29a to 29h are connected to electric wiring patterns 30a to 30h provided in the electrical connector section 21, respectively. These electric wiring patterns 30a to 30h are connected to the conductors 23a to 23h in the plug-side connector 20, respectively. As a result, the electric wiring patterns 29a to 29h correspond to the conductors 23a to 23h, respectively. Therefore, according to the relationship between the electric wiring patterns 23a to 29h and the conductors 23a to 23h, the optical fibers 2 which correspond to the spots 28 of the photoelectric conversion device 24 correspond to the conductors 23a to 23h one-on-one. When the electrical signal is of high frequency, the connector can be so constituted as to deal with high-speed signals by adapting designs of these wires such as the lengths of the wires to high-frequency signals. Thus, since an optical alignment is conducted in the connector (plug-side connector 20) in the present invention, the present invention is free of a problem of accuracy in alignment, unlike conventional devices which conduct the alignment with a substrate.

The photoelectric conversion device 24 can be attached to the waveguide 25 by soldering. Upon soldering, the photoelectric conversion device 24 is subjected to very high heat. However, according to the constitution of the present invention, for example, when the waveguide 25 having the electric wiring patterns 29 and the electrical connector section 21 having the electric wiring patterns 30 are electrically conducted and secured by means (such as an electrically conductive adhesive and compression bonding) other than a heat process, the photoelectric conversion device 24 is subjected to such high heat only when it is soldered to the waveguide 25. The reason is that in the photoelectric composite connector of the present invention, since the plug-side connector 20 and the receptacle-side connector 40 can be attached to and detached from each other freely by use of their electrical connector structures, there is no need to solder the waveguide 25 to the substrate 3 after the photoelectric conversion device 24 is soldered to the waveguide 25 as in the prior art, so that the photoelectric conversion device 24 is not subjected to heat generated by the latter soldering operation. As a result, according to the constitution of the present invention, a load of heat on the photoelectric conversion device 24 or the waveguide 25 can be reduced, as compared with the prior art.

Figure 7:
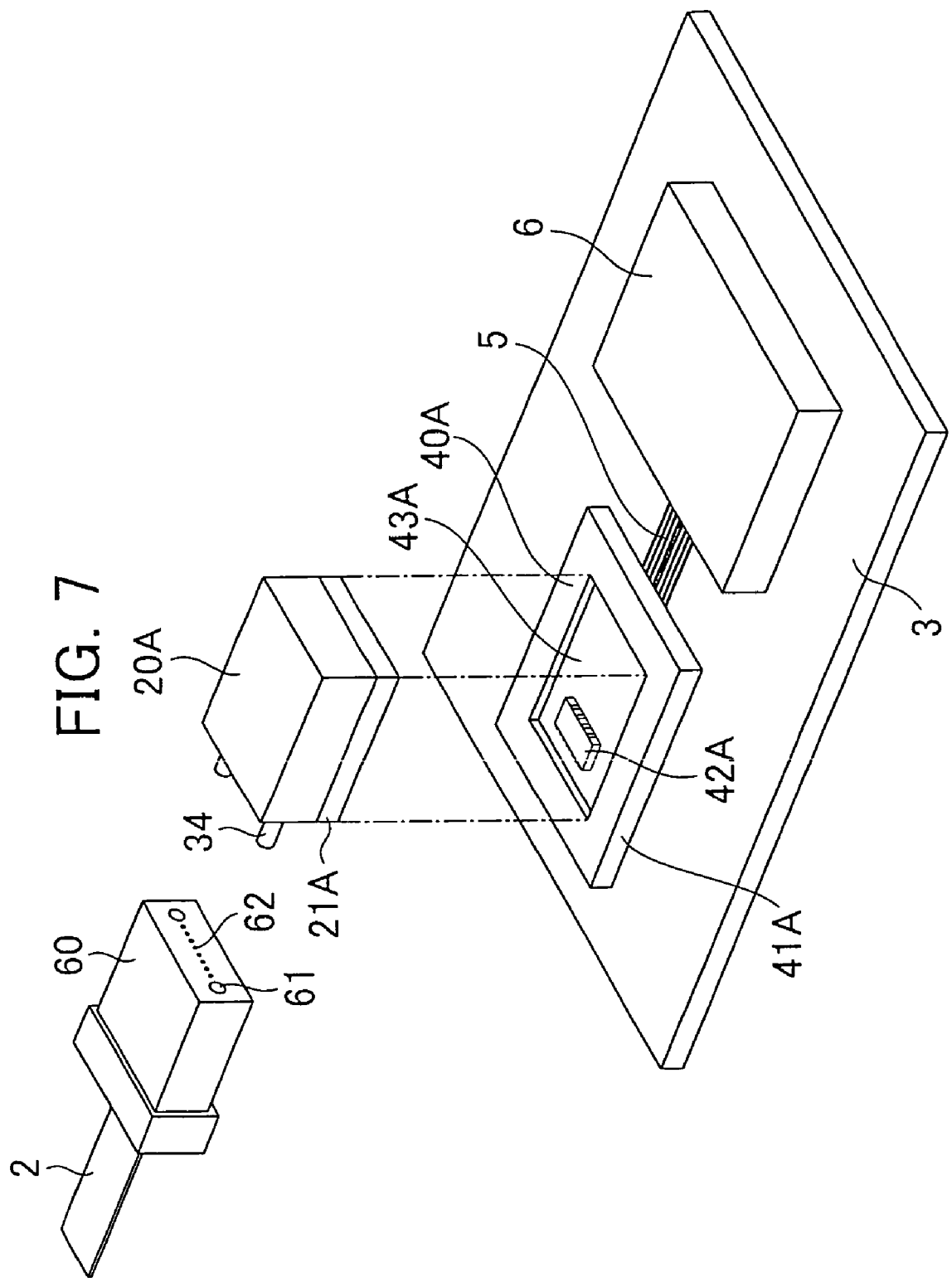
FIG. 7 is a diagram showing an example of connection using a photoelectric composite connector according to a second embodiment of the present invention.
Figure 8:
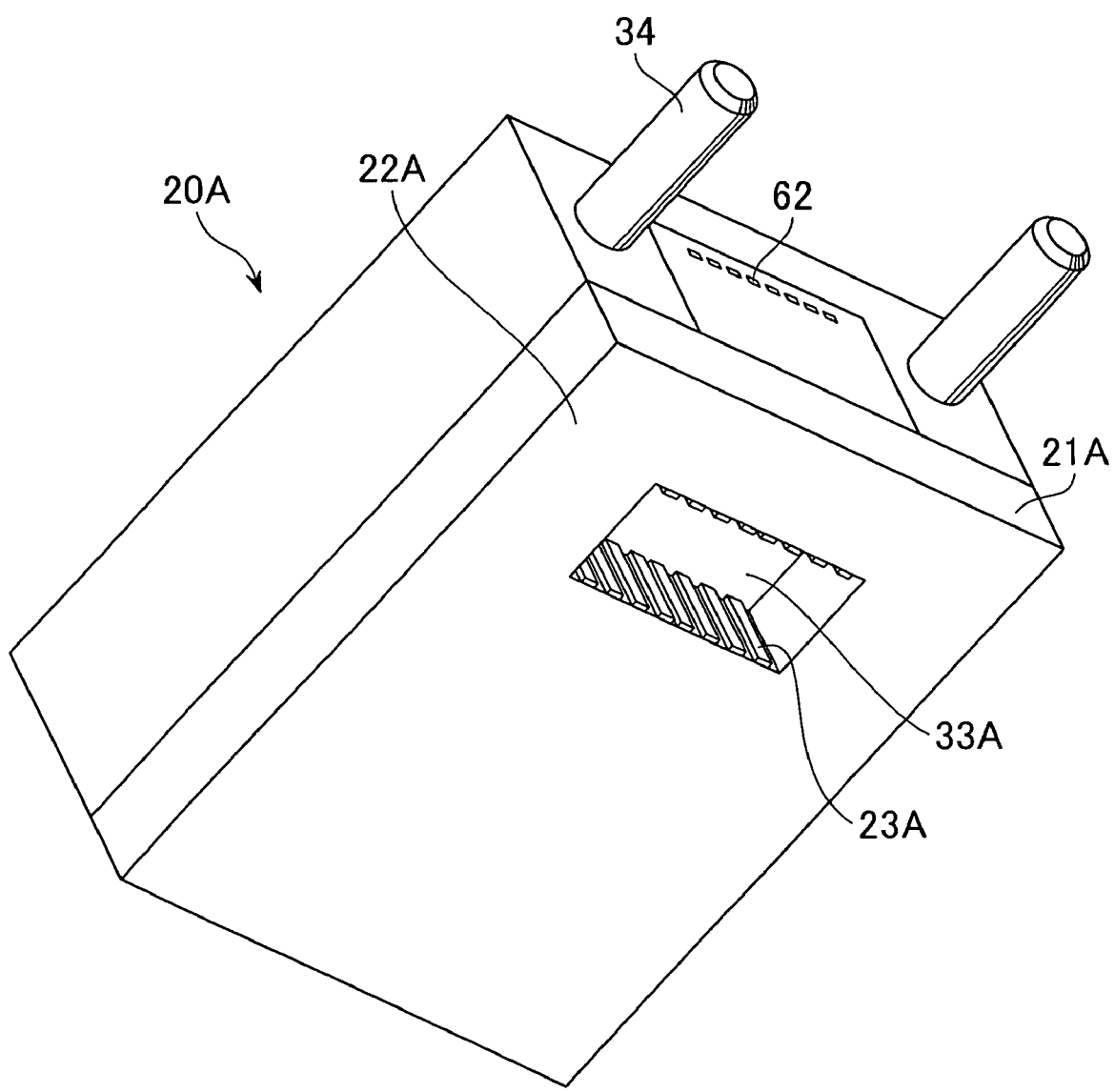
FIG. 8 is a diagram showing a plug-side connector shown in FIG. 7 when viewed from a side thereof which fits a receptacle-side connector.
Figure 9:
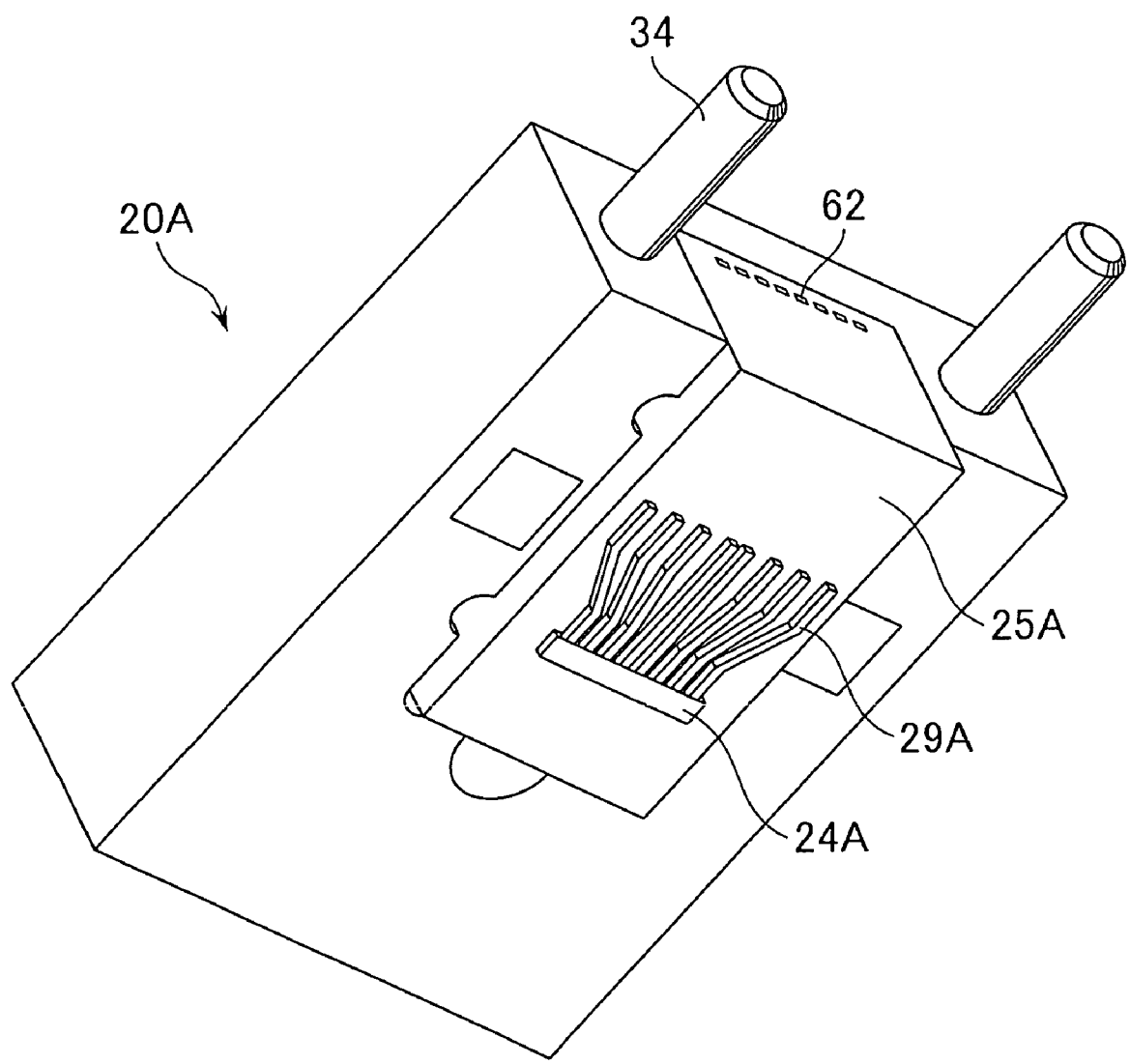
FIG. 9 is a diagram showing the plug-side connector shown in FIG. 8 without an electrical connector section.

Next, a second embodiment of the present invention will be described with reference to FIGS. 7 to 9. FIG. 7 is a diagram showing an example of connection between substrates, using a photoelectric composite connector according to the second embodiment. FIG. 8 is a diagram showing a plug-side connector shown in FIG. 7 when viewed from a side thereof which fits a receptacle-side connector. FIG. 9 is a diagram showing the plug-side connector shown in FIG. 8 without an electrical connector section. FIG. 8 and FIG. 9 correspond to FIG. 3 and FIG. 4 in the first embodiment, respectively. The same numbers are allocated to the same members as those in the first embodiment with "A" added after the reference numbers.

The second embodiment is different from the first embodiment primarily in that an auxiliary connector 60 is provided between an optical fiber 2 and a plug-side connector 20A. The auxiliary connector 60 can be attached to and detached from the plug-side connector 20A. In the present embodiment, the optical fiber 2 is connected not to the plug-side connector 20A but to the auxiliary connector 60. Such a constitution allows, for example, a number of different auxiliary connectors 60 to be connected to one plug-side connector 20A without connecting the optical fiber 2 to the plug-side connector 20A each time, thereby improving user-friendliness. Accordingly, an existing multicore ferrule (MT ferrule) can be used as the auxiliary connector.

The plug-side connector 20A can be connected to the auxiliary connector 60 by, for example, inserting two guide pins 34 which protrude from a side face of the plug-side connector 20A into corresponding holes 61 which are formed on a side face of the auxiliary connector 60 so as to guide the plug-side connector 20A to the auxiliary connector 60. By such a method, they can be connected in alignment easily. When they are connected in alignment, they are optically linked at a number of portions 62. That is, in this case, a so-called multicore link is adopted. However, as a matter of course, the present embodiment can also be applied to various other types of ferrules. Although not particularly shown in the drawing, their connection can be secured by, for example, using a clip which is elastically attached to these connectors along the entire extending direction of the connectors or placing and securing these connectors in a connector case to form a connector structure.

As is clear from the above description, the photoelectric composite connector of the present invention uses a general electrical connector structure. Therefore, although it can use light and electricity in combination, it is capable of connection between substrates, connection on a substrate or connection between devices in the same manner as general electrical connectors. Further, since this connector can use a generally used, standard electrical connector structure, a board designer can design circuits easily for the above connection between substrate or on a substrate, and transition of a printed circuit board for only electricity from a photoelectric composite printed circuit board can be achieved easily.

In the above example, the receptacle-side connector 40 itself is an electrical connector structure. However, the receptacle-side connector may be modified such that it has an electrical connector section as in the case of the plug-side connector 20. Further, as a variation, for example, the plug-side connector 20 is provided at both ends of an optical fiber, the receptacle-side connector 40 is provided on each of substrates to be connected to each other or at multiple spots on a substrate on which devices are connected to each other, and both ends of the plug-side connector 20 may be attached to and detached from the receptacle-side connector 40. Further, it is also possible that the plug-side connector 20 is provided at one end of the optical fiber 2, a multicore connector similar to that described in Patent Literature 1 is provided at the other end, the one end is connected to the receptacle-side connector 40, and the other end is connected to a photoactive device.

When an IC driver 6 which drives the photoelectric conversion device 24 is provided in the plug-side connector 20 or the receptacle-side connector 40 as in the prior art, the plug-side connector 20 and the receptacle-side connector 40 can be directly connected to each other without a substrate, even in the connector structure of the present invention.

Using an electrical connector structure, the photoelectric composite connector according to the present invention can be easily used for connection between substrates or connection on a substrate.

What is claimed is:

1. A photoelectric composite connector comprising:
   a first connector unit which is connected to optical transmission means, and
   a second connector unit which is configured to be directly attached to and directly detached from the first connector unit freely by utilizing their hollow structures, in a direction substantially perpendicular to a substrate on which the second connector unit is surface-mounted, so that the total height of the first connector unit and the second connector unit when the first connector unit and the second connector unit are connected to each other is less than the sum of their individual heights,
   wherein
   the first connector unit comprises a photoelectric conversion module and an electrical connector section having a first conductor which is electrically connected to the photoelectric conversion module,
   the second connector unit is formed as an electrical connector unit corresponding to the electrical connector section of the first connector unit and having a second conductor, and
   the first conductor of the electrical connector section of the first connector unit and the second conductor of the second connector unit are electrically connected to each other when the electrical connector section of the first connector unit and the second connector unit are connected to each other wherein the second connector unit comprises a photoelectric conversion module and an electrical connector section having the second conductor which is electrically connected to the photoelectric conversion module, and the first conductor of the electrical connector section of the first connector unit and the second conductor of the second connector unit are electrically connected to each other when the electrical connector section of the first connector unit and the electrical connector section of the second connector unit are connected to each other.

2. The connector of claim 1, wherein the photoelectric conversion module comprises a photoelectric conversion device and a waveguide.

3. The connector of claim 2, wherein the waveguide is a waveguide which changes the direction of a light path at a right angle.

4. The connector of claim 2, wherein both the waveguide and the photoelectric conversion device are of matrix type.

5. The connector of claim 2, wherein the photoelectric conversion device is VCSEL, a photodiode or an organic thin film having a light emitting function.

6. The connector of claim 2, wherein the substrate has a unit which drives the photoelectric conversion device.

* * * * *

UNITED STATES PATENT AND TRADEMARK OFFICE
CERTIFICATE OF CORRECTION

PATENT NO. : 7,488,119 B2
APPLICATION NO. : 11/656128
DATED : February 10, 2009
INVENTOR(S) : Takumi Yoshida It is certified that error appears in the above-identified patent and that said Letters Patent is hereby corrected as shown below:

Title Page, Item (73) Assignee should read:

--(73)   Assignees:       Hirose Electric Co., Ltd., Tokyo (JP),

Mitsubishi Denki ~~Deni~~ Kabushiki Kaisha, Tokyo (JP)--

Signed and Sealed this

First Day of September, 2009

David J. Kappos
*Director of the United States Patent and Trademark Office*